(12) United States Patent
Mahasivam et al.

(10) Patent No.: US 11,780,208 B2
(45) Date of Patent: Oct. 10, 2023

(54) MOULDED COMPOSITE ARTICLE FORMED FROM LAMINATES

(71) Applicant: Silueta (Private) Limited, Battaramulla (LK)

(72) Inventors: Sanje Mahasivam, Colombo (LK); Pasan Mihijaya, Colombo (LK); Sulochana Kumari, Colombo (LK); Nilusha Gunawardena, Colombo (LK)

(73) Assignee: Silueta (Private) Limited, Battaramulla (LK)

( * ) Notice: Subject to any disclaimer, the term of this patent is extended or adjusted under 35 U.S.C. 154(b) by 64 days.

(21) Appl. No.: 17/295,804

(22) PCT Filed: Nov. 21, 2019

(86) PCT No.: PCT/SG2019/050571
§ 371 (c)(1),
(2) Date: May 20, 2021

(87) PCT Pub. No.: WO2020/106221
PCT Pub. Date: May 28, 2020

(65) Prior Publication Data
US 2022/0024177 A1 Jan. 27, 2022

(30) Foreign Application Priority Data

Nov. 21, 2018 (SG) .............................. 10201810407S

(51) Int. Cl.
*B32B 5/24* (2006.01)
*B32B 7/02* (2019.01)
(Continued)

(52) U.S. Cl.
CPC ................ *B32B 7/022* (2019.01); *A41C 3/14* (2013.01); *A41D 31/02* (2013.01); *B29C 51/004* (2013.01);
(Continued)

(58) Field of Classification Search
None
See application file for complete search history.

(56) References Cited

U.S. PATENT DOCUMENTS

2005/0208874 A1    9/2005  Lau
2005/0208875 A1*   9/2005  Jagaric .................. A41C 3/144
                                                              450/39
(Continued)

FOREIGN PATENT DOCUMENTS

FR    2852882 A1 * 10/2004 ............. A41C 3/144
GB    2469691 A  * 10/2010 ............... A41C 3/10
(Continued)

OTHER PUBLICATIONS

Machine Translation of JP-10298812-A, Nov. 1998 (Year: 1998).*
(Continued)

*Primary Examiner* — Jeffrey A Vonch
(74) *Attorney, Agent, or Firm* — Osha Bergman Watanabe & Burton LLP

(57) ABSTRACT

Disclosed herein is a molded article made from two different polyurethane foam laminate materials, which displays both softness and resilience to machine washing. Also disclosed herein is a method of making said foam article.

15 Claims, 5 Drawing Sheets

(51) Int. Cl.
  *B32B 7/05*      (2019.01)
  *B32B 7/12*      (2006.01)
  *B32B 27/12*     (2006.01)
  *B32B 5/18*      (2006.01)
  *B32B 27/40*     (2006.01)
  *B29C 51/14*     (2006.01)
  *B32B 37/12*     (2006.01)
  *A41C 3/14*      (2006.01)
  *A41D 31/02*     (2019.01)
  *B32B 7/022*     (2019.01)
  *B29C 51/00*     (2006.01)
  *B32B 5/32*      (2006.01)
  *B32B 1/00*      (2006.01)
  *B29K 75/00*     (2006.01)
  *B29K 105/04*    (2006.01)
  *B29K 105/08*    (2006.01)
  *B29L 31/48*     (2006.01)
  *B32B 5/02*      (2006.01)

(52) U.S. Cl.
  CPC ............. *B29C 51/14* (2013.01); *B32B 1/00* (2013.01); *B32B 5/18* (2013.01); *B32B 5/245* (2013.01); *B32B 5/32* (2013.01); *B32B 7/02* (2013.01); *B32B 7/05* (2019.01); *B32B 7/12* (2013.01); *B32B 27/12* (2013.01); *B32B 27/40* (2013.01); *B32B 37/12* (2013.01); *B32B 37/1284* (2013.01); *B32B 37/1292* (2013.01); *B29K 2075/00* (2013.01); *B29K 2105/04* (2013.01); *B29K 2105/0809* (2013.01); *B29L 2031/4885* (2013.01); *B32B 5/02* (2013.01); *B32B 2250/04* (2013.01); *B32B 2250/40* (2013.01); *B32B 2255/102* (2013.01); *B32B 2266/0278* (2013.01); *B32B 2307/536* (2013.01); *B32B 2307/72* (2013.01); *B32B 2307/734* (2013.01); *B32B 2437/00* (2013.01); *B32B 2571/00* (2013.01); *Y10T 428/2495* (2015.01); *Y10T 428/24802* (2015.01); *Y10T 428/24851* (2015.01); *Y10T 428/24983* (2015.01); *Y10T 428/24992* (2015.01); *Y10T 428/249953* (2015.04); *Y10T 428/249981* (2015.04)

(56) References Cited

U.S. PATENT DOCUMENTS

| | | | | |
|---|---|---|---|---|
| 2006/0030238 | A1* | 2/2006 | Jagaric | A41C 5/005 450/57 |
| 2007/0190896 | A1* | 8/2007 | Yu | A41C 5/005 450/39 |
| 2007/0298681 | A1* | 12/2007 | Liu | A41C 3/122 450/39 |
| 2008/0153388 | A1 | 6/2008 | Liu | |
| 2009/0247047 | A1* | 10/2009 | Avalos-Dessner | A41C 3/10 450/55 |
| 2010/0124869 | A1* | 5/2010 | Liu | A41C 3/10 450/39 |
| 2012/0045966 | A1* | 2/2012 | Zhang | A41C 3/144 450/92 |
| 2012/0225257 | A1* | 9/2012 | Noda | B32B 5/04 264/138 |
| 2013/0165017 | A1* | 6/2013 | Liu | A41C 3/146 450/38 |
| 2014/0256221 | A1* | 9/2014 | Liang | A41C 5/005 450/1 |
| 2014/0273738 | A1* | 9/2014 | Raven | A41C 3/144 450/92 |
| 2014/0357157 | A1* | 12/2014 | Yip | A41C 5/005 2/243.1 |
| 2015/0017877 | A1* | 1/2015 | Cholet | A41C 5/005 450/92 |
| 2016/0366951 | A1* | 12/2016 | Pisani | A41C 5/005 |
| 2017/0360118 | A1* | 12/2017 | Randall | A41C 3/02 |

FOREIGN PATENT DOCUMENTS

| | | | | | |
|---|---|---|---|---|---|
| GB | 2490734 | A | * | 11/2012 | ............. B29C 44/14 |
| GB | 2519803 | A | * | 5/2015 | ........... A41C 3/0007 |
| JP | 03133479 | A | * | 6/1991 | |
| JP | 0530115 | U | * | 4/1993 | |
| JP | 10298812 | A | * | 11/1998 | |
| JP | 11323126 | A | * | 11/1999 | ......... C08G 18/4833 |
| JP | 2001200403 | A | * | 7/2001 | ............. A41C 3/144 |
| JP | 2009179891 | A | * | 8/2009 | |
| JP | 2009242996 | A | * | 10/2009 | |
| JP | 2012167221 | A | * | 9/2012 | |
| JP | 2013002019 | A | * | 1/2013 | |
| JP | 2015024028 | A | * | 2/2015 | |
| JP | 2016047909 | A | * | 4/2016 | |
| JP | 2019157281 | A | * | 9/2019 | |
| WO | WO-2005054327 | A1 | * | 6/2005 | ............. C08G 18/65 |
| WO | WO-2013141207 | A1 | * | 9/2013 | ............. B32B 5/245 |

OTHER PUBLICATIONS

Machine Translation of JP-2001200403-A, Jul. 2001 (Year: 2001).*
Google Translation of WO-2005054327-A1, Jun. 2005 (Year: 2005).*
Machine Translation of JP-2012167221-A, Sep. 2012 (Year: 2012).*
International Search Report issued in International Application No. PCT/SG2019/050571 dated Jan. 29, 2020 (3 pages).
Written Opinion issued in International Application No. PCT/SG2019/050571 dated Jan. 29, 2020 (6 pages).

* cited by examiner

MOULDED COMPOSITE ARTICLE FORMED FROM LAMINATES

FIELD OF INVENTION

This innovation is about developing a soft and light weight bra cup (product). This is achieved by making changes to the traditional process, the material combinations and the mold's design features.

BACKGROUND

The listing or discussion of a prior-published document in this specification should not necessarily be taken as an acknowledgement that the document is part of the state of the art or is common general knowledge.

Traditionally, bra cups are made from Polyurethane (PU). Two of the main properties of PU foam is its density and its hardness. There are low density and low hardness foams available in the market. However, using such a foam to make bra cups has been a challenge as it has not been possible to provide such a bra that is considered to be fit for purpose by consumers. In other words, such bras have failed to satisfy the requirements of consumers, which can be measured by tests that include machine washability, dimensional stability to wash, colour fastness to heat, colour fastness to light/ozone/burnt gas fumes tests. In particular, it has proved difficult satisfy the wash durability test requirement. As such, bras made of low density and low hardness foams have not been considered commercially viable. Nevertheless, consumers desire light weight and comfortable/soft bras that they can be machine washed.

As will be appreciated, the use of low density and low hardness foams may have desirable commercial attributes if the issues above can be resolved. These advantages include the ability to provide a softer hand-feel to the consumer, as well as being lighter. As such, there remains a need for a new product that overcomes the above issues, as well as a process to produce said product.

SUMMARY OF INVENTION

A special method has been successfully developed to process a low density and low hardness foam to manufacture bra cups. The product successfully achieves the required testing standards including the machine washability, dimensional stability to wash, colour fastness to heat, colour fastness to light/ozone/burnt gas fumes tests.

Thus, a molded article and a method of making said molded article are disclosed in the following numbered clauses.

1. A molded composite article, comprising:
    a first foam laminate formed from a fabric and a polyurethane foam having a density of from 10 to 25 kg/m$^3$ and a hardness of from 2 to 20, as measured using an Asker type F Durometer;
    a second foam laminate formed from a fabric and a polyurethane foam having a hardness of from 5 to 95, as measured using an Asker type F Durometer; and
    an adhesive bonding the first and second laminates together, wherein the composite article displays one or both of:
    after ten machine wash and dry cycles, the composite article displays less than 3% shrinkage in a length and a width direction, as compared to the original length and width dimensions of the composite article; and
    the composite article does not exhibit any delamination between the first and second foam laminates following twenty-five machine wash and dry cycles.
2. The article according to Clause 1, wherein the first foam laminate has a density of from 18 to 22 kg/m$^3$.
3. The article according to Clause 1 or Clause 2, wherein the first foam laminate has a hardness of from 5 to 15, as measured using an Asker type F Durometer.
4. The article according to any one of the preceding clauses, wherein the second foam laminate has a density of from 10 to 80 kg/m$^3$, such as from 39 to 45 kg/m$^3$, such as 42 kg/m$^3$.
5. The article according to any one of the preceding clauses, wherein the second foam laminate has a hardness of from 45 to 90, such as from 45 to 60, such as from 52 to 60, as measured using an Asker type F Durometer.
6. The article according to any one of the preceding clauses, wherein the first foam laminate is from 5 to 40% thinner relative to the same material before compression molding and the second foam laminate is from 12.5 to 83% (e.g. from 17 to 83%, such as from 17 to 75%) thinner relative to the same material before compression molding.
7. The article according to any one of the preceding clauses, wherein the first foam laminate is from 7 to 15%, such as 10%, thinner relative to the same material before compression molding and the second foam laminate is from 25 to 60%, such as 25% or 50%, thinner relative to the same material before compression molding.
8. The article according to any one of the preceding clauses, wherein the first foam laminate was prepared by a low-tension lamination arrangement with use of a relaxed fabric.
9. The article according to any one of the preceding clauses, wherein the first foam laminate was prepared by spray lamination, or wherein the first foam laminate was prepared by hot melt lamination using a low-tension lamination arrangement with use of a relaxed fabric.
10. The article according to any one of the preceding clauses, wherein the second foam laminate was prepared by spray lamination or, more particularly, by hot melt lamination.
11. The article according to any one of the preceding clauses, wherein the article is a bra cup, a bra, a bra strap or the whole or part of an impact protection garment.
12. The article according to any one of the preceding clauses, wherein the adhesive bonding the first and second laminates together is located in a peripheral region of the first and second laminates when said laminates are bonded together by said adhesive.
13. A method of forming a molded article comprising the steps of:
    (a) providing a first foam laminate panel formed from a fabric and a polyurethane foam having a density of from 10 to 25 kg/m$^3$ and a hardness of from 2 to 20 and a second foam laminate formed from a fabric and a polyurethane foam having hardness of from 5 to 95, where each laminate has a foam side and a fabric side and the hardness of the foam laminates is measured using an Asker type F Durometer;
    (b) subjecting the second foam laminate panel to thermoforming to provide a molded outer panel having a thickness that is from 12.5 to 83% (e.g. from 17 to 83%, such as from 17 to 75%) thinner relative to the same material before thermoforming;
    (c) applying an adhesive to the foam side of the first foam laminate panel and adhering the resulting glue-covered foam side of the first foam laminate panel to the foam side of the molded outer panel to form an intermediate product;

(d) subjecting the intermediate product to thermoforming to form a molded article, where the first foam panel forms an inner panel of the molded article and has a thickness that is from 5 to 40% thinner relative to the same material before thermoforming.

14. The method according to Clause 13, wherein the first foam laminate has a density of from 18 to 22 kg/m$^3$.

15. The method according to Clause 13 or Clause 14, wherein the first foam laminate has a hardness of from 5 to 15, as measured using an Asker type F Durometer.

16. The method according to any one of Clauses 13 to 15, wherein the second foam laminate has a density of from 10 to 80 kg/m$^3$, such as from 39 to 45 kg/m$^3$, such as 42 kg/m$^3$.

17. The method according to any one of Clauses 13 to 16, wherein the second foam laminate has a hardness of from 45 to 90, such as from 45 to 60, such as from 52 to 60, as measured using an Asker type F Durometer.

18. The method according to any one of Clauses 13 to 16, wherein the first foam laminate panel has a thickness that is from 7 to 15%, such as 10%, relative to the same material before thermoforming and the second foam laminate has a thickness that is from 25 to 60%, such as 25% or, more particularly, 50%, relative to the same material before thermoforming.

19. The method according to any one of Clauses 13 to 18, wherein the first foam laminate was prepared by a low-tension lamination arrangement with use of a relaxed fabric.

20. The method according to any one of Clauses 13 to 19, wherein the first foam laminate is prepared by spray lamination or wherein the first foam laminate is prepared by hot melt lamination using a low-tension lamination arrangement with use of a relaxed fabric.

21. The method according to any one of Clauses 13 to 20, wherein the second foam laminate is prepared by spray lamination or, more particularly, by hot melt lamination.

22. The method according to any one of Clauses 13 to 21, wherein the article is formed into a bra cup, a bra, a bra strap or the whole or part of an impact protection garment.

23. The method according to any one of Clauses 13 to 22, wherein the adhesive bonding the first and second laminates together is located in a peripheral region of the first and second laminates when said laminates are bonded together by said adhesive.

DRAWINGS

Figure 2:
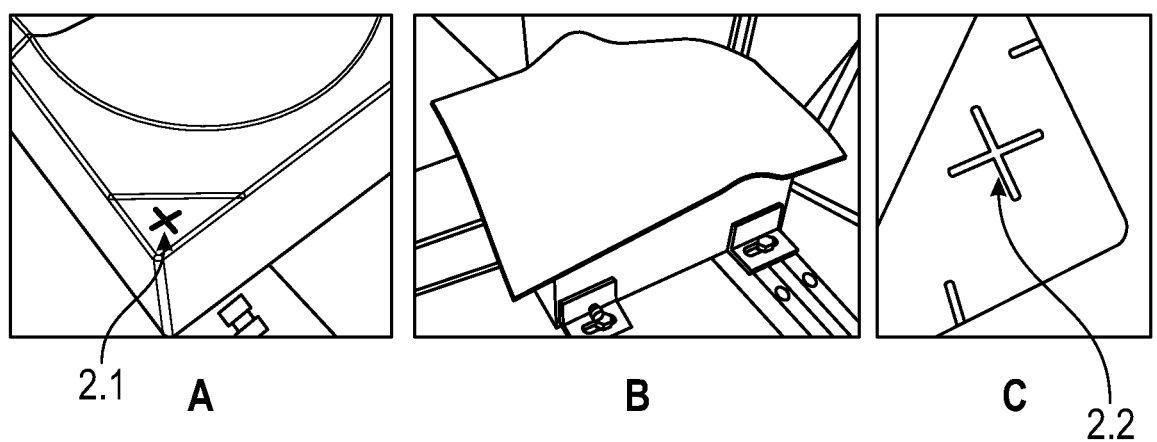
FIG. 2 (A) depicts a cup mold having a notch mark; (B) the laying of a laminated outer cup panel comprising a fabric and a regular PU foam onto the mold; and (C) the resulting cross mark on the molded outer cup.
Figure 3:
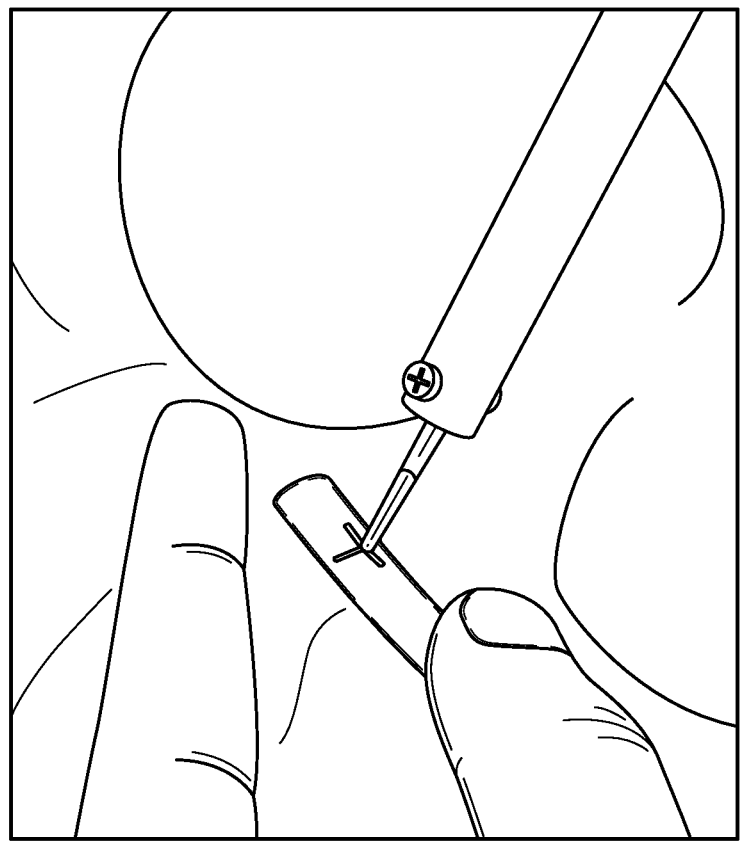
FIG. 3 depicts punching a hole through the cross mark with a heated rod on the outer cup portion.
Figure 5A:
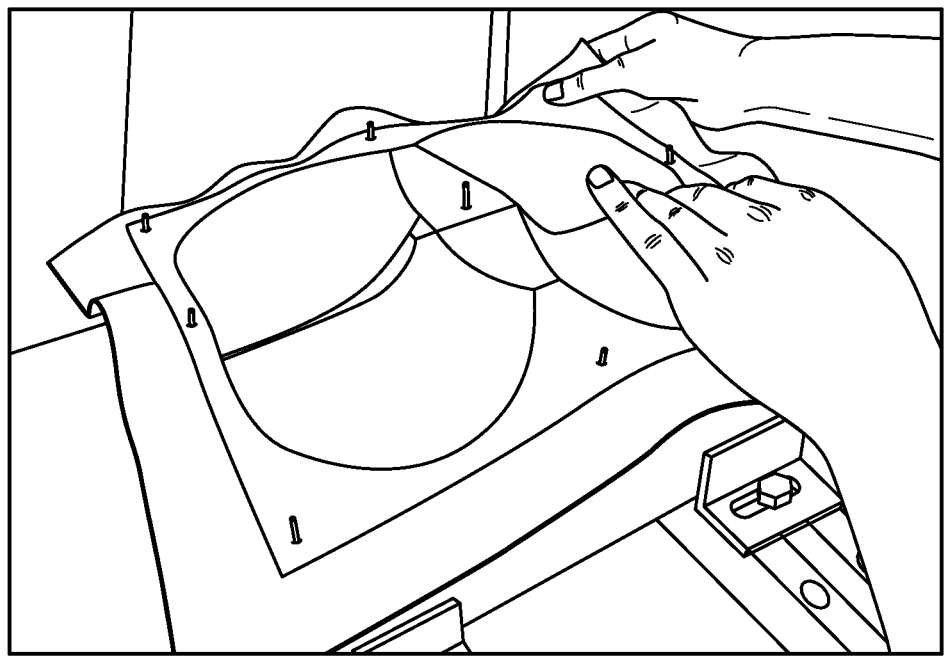
Figure 5B:
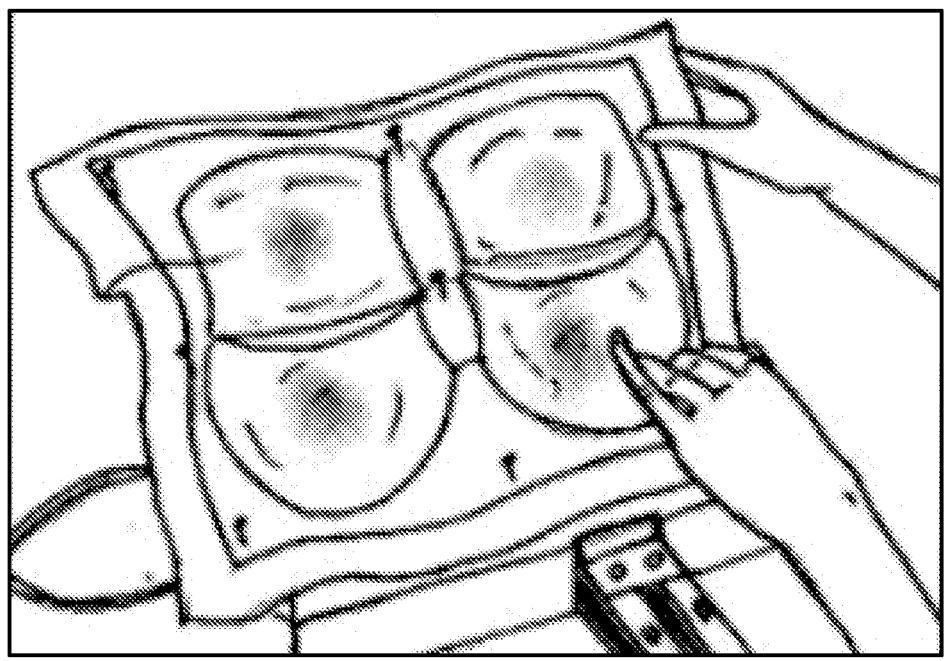

FIG. 5 photo (A) and sketch (B) both depict the loading of the outer panel of FIGS. 2 and 3 onto a final mold using pins to hold it in position.

Figure 4:
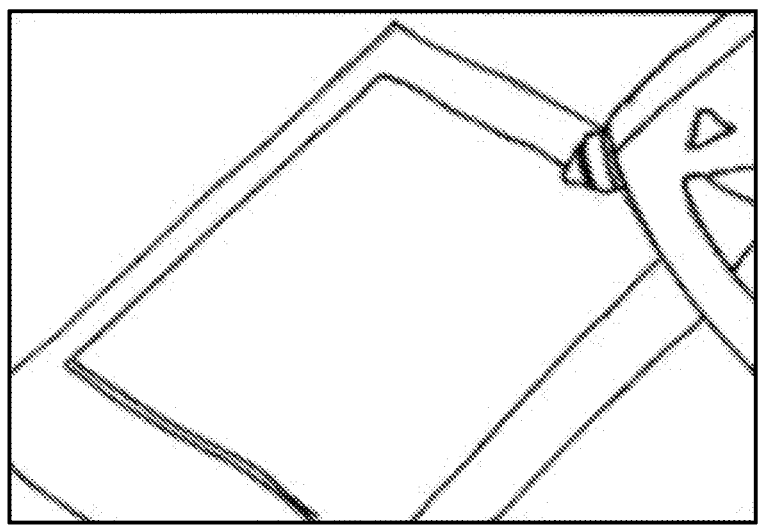
FIG. 4 depicts the application of glue to an inner panel laminate comprising a soft PU foam and a fabric by spraying. The spraying can be machine spraying or hand spraying.
Figure 6:
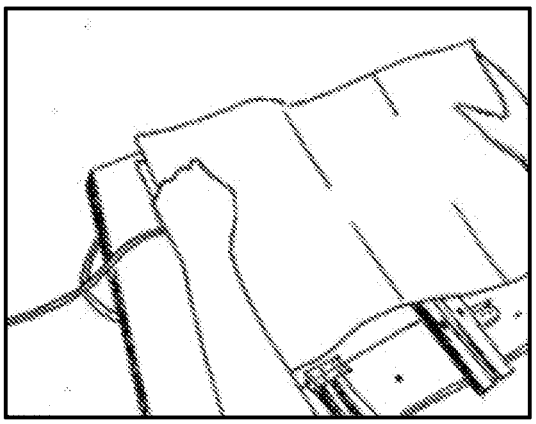
Figure 6:
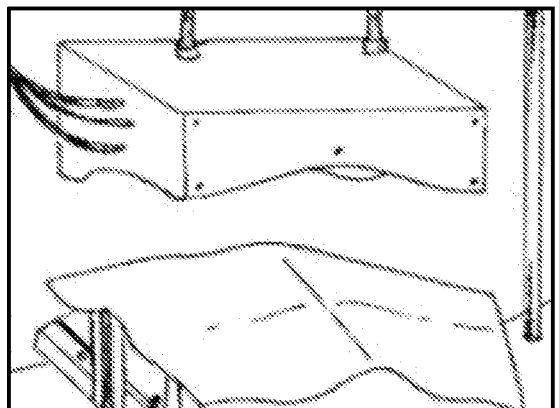

FIG. 6 depicts the application of the glued surface of the inner panel (from FIG. 4) onto the outer panel on the final mold (from FIGS. 5A and 5B), with (A) showing the initial positioning and (B) showing the inner layer placed onto the outer layer and ready for molding.

Figure 7:
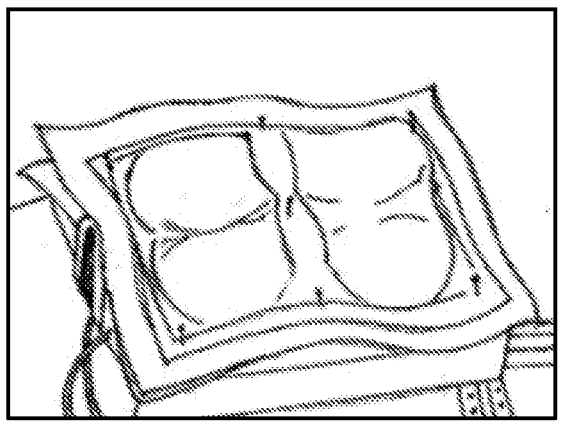
Figure 7:
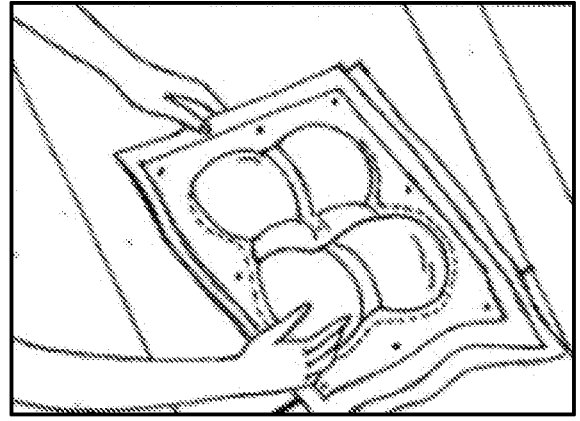

FIG. 7 (A) depicts the molded product obtained from the FIG. 6(B) immediately after molding and (B) after unloading from the mold.

Figure 8:
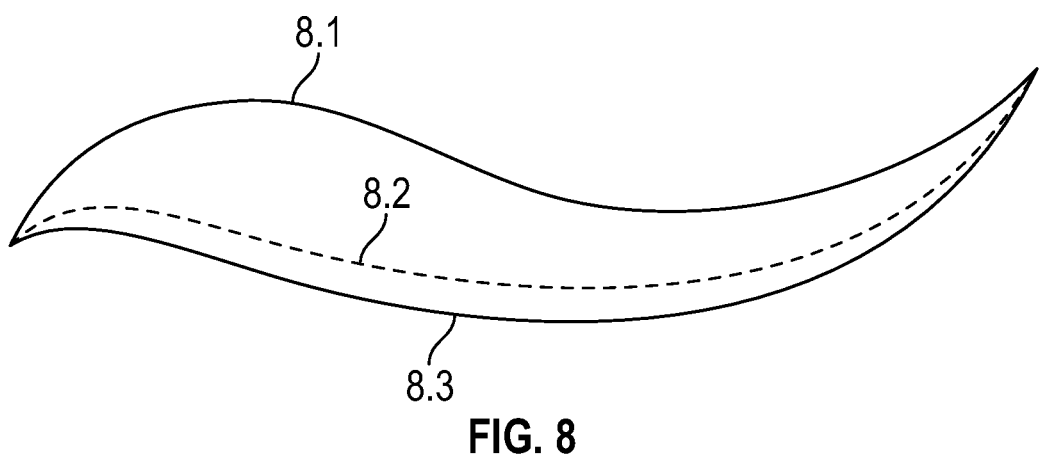

FIG. 8 depicts a cross section of a bra cup according to the current invention.

Figure 9:
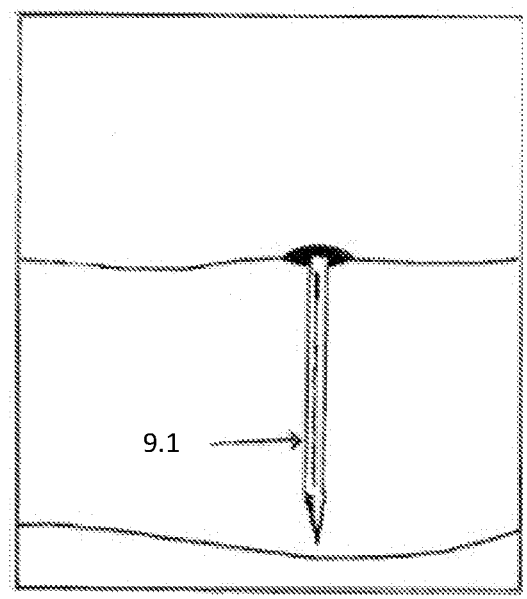

FIG. 9 depicts a mold having a pin for forming a perforation on the outer cup portion during molding.

DESCRIPTION

In a first aspect of the invention, there is provided a molded composite article, comprising:
 a first foam laminate formed from a fabric and a polyurethane foam having a density of from 10 to 25 kg/m$^3$ and a hardness of from 2 to 20, as measured using an Asker type F Durometer;
 a second foam laminate formed from a fabric and a polyurethane foam having a hardness of from 5 to 95, as measured using an Asker type F Durometer; and
 an adhesive bonding the first and second laminates together, wherein the composite article displays one or both of:
 after ten machine wash and dry cycles, the composite article displays less than 3% shrinkage in a length and a width direction, as compared to the original length and width dimensions of the composite article; and
 the composite article does not exhibit any delamination between the first and second foam laminates following twenty-five machine wash and dry cycles.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

When used herein the term "fabric" refers to a flexible material formed by a network of natural or artificial fibres, such as a yarn or thread. This network of fibres may be created in any suitable manner, such as by weaving, knitting, spreading, crocheting, bonding, etc. Yarn is produced by spinning raw fibres of a natural or artificial fiber to produce long strands.

When used herein, the term "laminate" is intended to refer to the attachment to two (or more) layers of material together by any suitable lamination method. Examples of suitable lamination methods include, but are not limited to spray lamination (e.g. spraying a glue onto one or both surfaces of the materials that are to be laminated together) or hot melt lamination. It will be appreciated, that lamination generally requires the presence of an adhesive of some form to create the attachment between the component materials. Any suitable adhesive may be used to create the attachment and is not particularly limited herein, except that it should form a bond. Suitable adhesives may be derived from polyurethane, polyamide, co-polyamide, polyester, co-polyester, acrylic adhesives and combinations thereof. Particular examples of adhesives that may be mentioned herein include heat activated adhesives that may be provided as layers, i.e. a heat activated layer adhesive (e.g. web adhesive).

The first foam laminate is formed from the lamination of a fabric with a polyurethane foam. This foam has a density of from 10 to 25 kg/m$^3$, such as from 18 to 22 kg/m$^3$. For the avoidance of doubt, the density of a piece of foam, can be calculated by dividing the weight of the foam by its volume (e.g. width×height×length). The polyurethane foam also has a hardness of from 2 to 20, such as from 5 to 15. When mentioned herein, the "hardness" values relate to the units provided by the Asker type F Durometer, which has a scale of from 0 to 100 (e.g. see https://www.asker.co.jp/en/products/durometer/analog/f/).

The first foam laminate may be formed by any suitable lamination method. However, the type of lamination method used may influence other parameters in the production process. One particular example of a suitable lamination method for the first foam laminate is spray lamination. Another example of a suitable lamination method for the first foam laminate is hot-melt lamination. However, when hot-melt lamination is used for the first foam laminate, the laminate may be prepared by a low-tension lamination arrangement with use of a relaxed fabric, as explained in more detail hereinbelow.

The second foam laminate is formed from the lamination of a fabric with a polyurethane foam. This foam has a hardness of from 5 to 95, such as from 45 to 90, such as from 45 to 60, such as from 52 to 60, as measured using an Asker type F Durometer. The polyurethane foam in the second foam laminate may have any suitable density. As such, the density of the polyurethane foam in the second foam laminate may be from 10 to 80 kg/m$^3$, such as from 39 to 45 kg/m$^3$, such as 42 kg/m$^3$.

The second foam laminate may be formed by any suitable lamination method. Particular examples of suitable lamination methods for the second foam laminate include, but are not limited to, spray lamination and hot melt lamination.

Without wishing to be bound by theory, it is believed that the use of a spray lamination method for the first laminate may result in an article having improved washability. In particular, the use of spray lamination is believed to result in articles having improved washability when compared to corresponding articles where the first laminate is prepared by hot melt lamination.

In embodiments of the invention that may be mentioned herein, the first foam laminate may be from 5 to 40% thinner relative to the same material before compression molding and the second foam laminate may be from 12.5 to 83% (e.g. from 17 to 83%, such as from 17 to 75%) thinner relative to the same material before compression molding. In yet further embodiments of the invention that may be mentioned herein, the first foam laminate may be from 7 to 15%, such as 10%, thinner relative to the same material before compression molding and the second foam laminate may be from 25 to 60%, such as 25% or 50%, thinner relative to the same material before compression molding.

Alternatively or additionally, in embodiments of the invention that may be mentioned herein, the total combined thickness of the two foam laminate layers (first and second foam) may be from about 10% to about 60%, such as about 15% to about 40%, for example about 20% to about 35%, thinner relative to the combined thickness of the two foams before compression molding.

In embodiments of the invention that may be mentioned herein, the thickness of the first foam laminate after compression molding may be from about 1 mm to about 8 mm, and the thickness of the second foam laminate after compression molding may be from about 0.3 mm to about 3 mm. As will be appreciated by the skilled person, the thickness of the foam laminates will depend on the specific article.

The article described herein may be any suitable article. Examples of suitable articles include, but are not limited to, a bra cup, a bra, a bra strap or the whole or part of an impact protection garment. As used herein, "impact protection garment" means a garment or other article that is designed to reduce the negative effects of an impact on the body of a user. The impact could be any type of impact, for example impacts due to falling or otherwise colliding with an object, impacts due to sports or other exercise activities, or impacts due to professional workplace hazards. The impact protection garment could be designed to protect various parts of a user's body, for example the ankles, shins, knees, thighs, hips, torso, shoulders, elbows, wrists and/or the head of a user.

Exemplary thicknesses of the first (inner) and second (outer) layers after compression are provided in Table 1 below for various garment types.

TABLE 1

| Type of garment | Exemplary first (inner) layer thickness (mm) | Exemplary second (outer) layer thickness (mm) |
| --- | --- | --- |
| Bra cup | 3-6, such as 4.5 | 1-2, such as 1.5 |
| Bra strap | 1-2, such as 1.5 | 0.3-0.7, such as 0.5 |
| Impact protection garment | 4-8, such as 6 | 1-3, such as 2 |

When referred to herein, "compression molding" may refer to any suitable compression molding technique, such as thermoforming.

For the avoidance of doubt, when any numerical range is used herein, the higher and lower values of any related ranges may be combined to provide new ranges, which are all specifically contemplated herein. For example, the second foam laminate may be thinner by the following numerical ranges:

from 12.5 to 17%, from 12.5 to 25%, from 12.5 to 50%, from 12.5 to 60%, from 12.5 to 75%, from 12.5 to 83%;

from 17 to 25%, from 17 to 50%, from 17 to 60%, from 17 to 75%, from 17 to 83%;

from 25 to 50%, from 25 to 60%, from 25 to 75%, from 25 to 83%;

from 50 to 60%, from 50 to 75%, from 50 to 83%;

from 60 to 75%, from 60 to 83%; and from 75 to 83%.

In embodiments described herein, the first foam laminate may have been prepared by a low-tension lamination arrangement with use of a relaxed fabric. Typically, a fabric is provided by suppliers in a roll form, where the roll has been wound with a high tension. As such, before use in the processes described below, the fabric is unwound from the roll, which therefore releases the tension and places it into a relaxed state. As such, when used herein "relaxed fabric" refers to a fabric that has been allowed to unwind from the supplier's roll and allowed to release the tension that it was wound under. As will be appreciated, in order to bond the fabric and foam together, a lamination machine is used. The lamination machine has winder rolls that move the material forward in the machine. As the foam used in the first foam laminate is soft in nature (see hardness and density values above), the winder roll is used with a low tension. For example, for a normal (i.e. less soft) foam with a thickness of 5 mm, it would be laminated with a winder roll tension of from 20-30N (e.g. 23N), while the softer foam (e.g. with same thickness) used in the first laminate will get laminated with a winder roll tension of from 15 to 25N (e.g. 18N). Thus, when used herein, the term "low-tension lamination arrangement" will be understood to mean that the winder roll has a tension of from 15 to 25N, such as 18N.

The first and second laminates are bonded together by an adhesive. Any suitable adhesive may be used for this purpose. For example, the adhesive may be one that provides a sufficiently strong bond between the first and second foam laminates, such that no delamination between the first and second foam laminates is exhibited following twenty-five machine wash and dry cycles. As mentioned above, suitable adhesives include, but are not limited to, those derived from polyurethane, polyamide, co-polyamide, polyester, co-polyester, acrylic, and combinations thereof. A particular class of adhesives that may be used is heat activated adhesives that may be provided as layers, i.e. a heat activated layer adhesive (e.g. web adhesive).

When used herein, "machine wash and dry cycle" means subjecting the garment to a cycle involving both machine washing and machine drying. When used herein, the machine washing conditions refer to placing one or more of the garments into a washing machine along with a suitable ballast to provide a load of 1.8 kg. The machine is loaded with 45 mL of a liquid detergent and the machine is set to run using the "delicates" setting and a cold temperature wash (27° C.±3° C.). The garment is then subsequently dried using a tumble drying machine set on the "delicate" tumble drying setting using the same ballast. This wash and dry cycle is then repeated until the garment has undergone 25 wash and dry cycles and then the garment is assessed to see if the two laminate layers are still bonded together without any sign of delamination. Under the same wash and dry conditions mentioned above, the composite material may also (or alternatively) display less than 3% shrinkage in the length and width directions (as compared to its original unwashed dimensions) after ten wash and dry cycles. This dimensional change can be measured using the procedure described in the AATCC 150 procedure.

In certain embodiments, the adhesive that bonds the first and second foam laminates together may be located at a peripheral region of the first and second foam laminates, such that the laminates are bonded together by said adhesive. When used herein, the term "peripheral region" may refer to a region at or close to the edges of the first and second foam laminates and the adhesive may be applied to the whole or to part of this peripheral region. For example, the adhesive may be applied along the entire edge of one or both of the foam laminates or it may be applied to only one portion of one or both of the foam laminates that a little away from the edge, or the adhesive may be applied intermittently at the edge and/or a little away from the edge (but still in the peripheral region) on one or both of the foam laminates.

Without wishing to be bound by theory, it is believed that bonding the first and second foam laminates at a peripheral region can lead to an article having a less crushed appearance and improved washability. When the glue is applied in a zonal manner on particular areas of the bra cup (i.e. on a peripheral region) then a minimal amount of glue is applied at the centre area of the article (e.g. a bra cup). This is believed to allow for a small gap to be present between the main portions of the two foam layers and reduces abrasion of the two foam layers during normal use and a machine wash and dry cycle.

The molded article described herein may be formed by the steps of:
(a) providing a first foam laminate panel formed from a fabric and a polyurethane foam having a density of from 10 to 25 kg/m$^3$ and a hardness of from 2 to 20 and a second foam laminate formed from a fabric and a polyurethane foam having hardness of from 5 to 95, where each laminate has a foam side and a fabric side and the hardness of the foam laminates is measured using an Asker type F Durometer;
(b) subjecting the second foam laminate panel to thermoforming to provide a molded outer panel having a thickness that is from 12.5 to 83% (e.g. from 17 to 83%, such as from 17 to 75%) thinner relative to the same material before thermoforming;
(c) applying an adhesive to the foam side of the first foam laminate panel and adhering the resulting glue-covered foam side of the first foam laminate panel to the foam side of the molded outer panel to form an intermediate product;
(d) subjecting the intermediate product to thermoforming to form a molded article, where the first foam panel forms an inner panel of the molded article and has a thickness that is from 5 to 40% thinner relative to the same material before thermoforming.

The process is generically described below with reference to the accompanying figures.

1. Laminate a fabric with the special ultra soft polyurethane foam using the spray lamination method (referred to as laminate 1—this will be used for the inner side of the cup). When used herein, the term "ultra soft polyurethane foam" is intended to refer to a polyurethane foam having a density of from 10 to 25 (such as 18 to 22) kg/m$^3$ and a hardness of from 2 to 20 (such as 5 to 15), as measured using an Asker type F Durometer. Spray lamination as used herein refers to a method of lamination whereby glue is applied by spraying to at least one of the materials that forms the laminate (e.g. the fabric and/or the foam), which are then contacted to each other and are bonded together by the glue.

Prior to lamination, the fabric is first unwound from a roll form (in high tension) to a sheet form (at a relaxed state with little or no tension). A lamination machine with winder rolls (to move materials forward in the machine) may be used to bond the fabric and the polyurethane foam together. Typically, a normal foam with a thickness of 5 mm may be laminated onto the fabric with a winder roll tension of 20 N to 30 N. Given that laminate 1 of the current invention comprises an ultra soft polyurethane foam, a low winding roll tension of 15 N to 25 N (or more preferably, a tension of 18 N) may be used instead, to avoid damaging the foam.

2. Laminate a fabric with the regular polyurethane foam using the hotmelt lamination method (this is referred to as the laminate 2, which is used for the outer side of the cup). When used herein "regular polyurethane foam" means a polyurethane foam having a density of from 39 to 45 kg/m$^3$ and a hardness of from 5 to 95 (such as 45 to 60), as measured using an Asker type F Durometer. While any lamination method (e.g. spray lamination) may be used, it has been found that hotmelt lamination is particularly suited for the formation of the outer panel.

Figure 1:
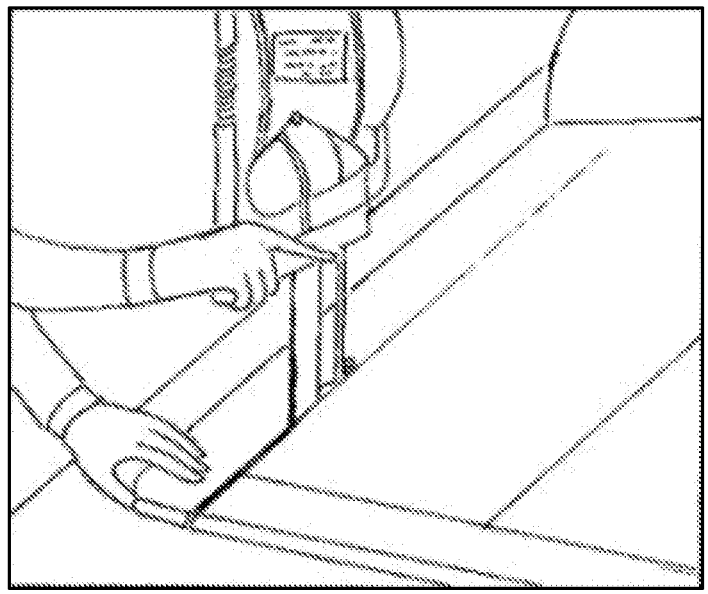
FIG. 1 depicts the cutting of panels used in making a bra according to the current invention.

3. Cut panels as per the appropriate size from the laminate 1 and laminate 2 (see FIG. 1). As depicted in FIG. 1, the laminates may be cut at the same time to ensure that they match, or they may be cut separately with the aid of a template.

4. Take the cut panel of the laminate 2 and thermoform it at the suitable/unique molding settings (e.g. 185° C. for 60 seconds). As shown in FIG. 2(*a*), the mold used to manufacture the outer cup contains a number of notches (e.g. 2.1) that are transferred to the outer cup during molding. As shown in FIG. 2(*c*), this transferal of the notch results in an embossed cross mark (2.2) on the outer panel. The resulting panel is referred to herein as the molded outer panel 2.

5. The panel of step 4 is unloaded from the mold and is punched at the cross mark using a heated rod (see FIG. 3).
6. Laminate 1 is treated to apply a layer of glue to the foam side using a spray method. Any spray method may be used, such as machine spraying and hand spraying (FIGS. 4*a* and 4*b*, respectively). The resulting panel is referred to herein as inner panel 1.

As will be appreciated, the glue may be applied to specific areas of laminate 1 (i.e. on a whole or part of a peripheral region). For example, in a bra cup of the current invention, the glue may be applied predominantly on the perimeter of the cup, and minimally on the center area of the bra cup. This is to ensure that the inner panel 1 and outer panel 2 (when combined together) do not abrade each other during use and during washing. This results in a bra cup having less crush appearance, which gives a better wash test result.

7. Take the molded outer panel 2 and load it to the final mold. While loading, it is necessary to make sure that the pin positions are properly in place (e.g. FIGS. 5A and 5B). These pins are positioned through the holes punched in the embossed crosses on the outer panel.
8. Inner panel 1 is placed on top of the loaded outer panel 2 as shown in FIG. 6*a*. The glue applied to one side of the inner panel 1 should touch the foam side of the molded panel 2. The ready to mold panel is shown in FIG. 6*b*.
9. The combined product is thermoformed at a suitable setting (e.g. 185° C. for 180 seconds).
10. The resulting cup is unloaded from the mold and is then trimmed to obtain the desired bra cup (e.g. see FIGS. 7*a* and *b*).

As will be appreciated, it is possible to change the ordering of at least some of the process steps mentioned herein without affecting the final product. For example, it is possible to make the intermediate inner foam panel first (not subject to compression; step 6 above) and then the outer foam panel (subject to compression; steps 1 to 5 above), before conducting steps 7 to 10.

In addition, some of the above-mentioned process steps may be omitted or made more efficient using other step which serves similar functions. For example, in steps 4 and 5 where cross marks and perforations are formed, respectively, on the outer cup, a mold with notches is used to form the embossed cross mark, followed by using a heating rod to form a perforation over the cross mark. This two-step process to form a perforation may be replaced by a single step using a mold having a pin 9.1 at the relevant positions (see FIG. 9). The pin essentially replaces the heating rod and the notch on the mold, and it functions by punching the foam panel to create perforations during the molding process. As such, perforations can be produced on the outer panel directly during molding, thereby avoiding the need to form an embossed cross mark prior to forming a perforation.

This invention involves the design of metal (e.g. aluminum) molds to ensure that the softness of the inner side and the wash performance of the cup is maximized. This is explained in more detail below.

The laminate 2 is compressed more during the first molding, while the final mold offset is designed to be higher to ensure that the softer foam is delicately compressed so that it keeps its soft hand-feel. FIG. 8 shows a cross section of the final pad/cup of the process (8.3), which comprises an outer male portion (8.2) and an inner male portion (8.1). FIG. 8 shows that the outer pad (8.2) has been subjected to a higher degree of compression than the inner pad (8.1).

The process description above is to make a lightly lined bra cup. It is also possible to make uplift bra cups and push up bra cups using the ultra-soft foam by tweaking the process. Other products can be formed, such as impact protection garments and bra straps using the method above adapted for the production of such products.

As such, this invention involves the design of metal (e.g. aluminum molds) that ensure the softness of the inner side of the bra and help to maximize the wash performance of the resultant cup. This is achieved by ensuring that the outer foam panel is compressed more during the first molding step. However, the final mold off-set is designed to be higher to ensure that the softer foam is delicately compressed so that it will keep its soft hand feel.

Surprisingly, the garments of the invention display resilience in that they do not display any delamination between the first and second laminate materials even after being subjected to twenty-five machine wash and dry cycles, while providing improved softness and handfeel.

Advantages Associated with Process

It has been unexpectedly found that:
a) using a spray and/or a low tension method to laminate the ultra-soft polyurethane foam to a fabric; and
b) ensuring that the inner foam is minimally compressed during cup formation, provides the desired improvements wash performance (e.g. using AATCC 150, or the tests described in AATCC 150 with the wash-dry cycle procedure mentioned hereinbelow). In addition, the products have a soft hand feel on the inner side of the bra cup, and are light-weight (e.g. 20% lighter than a standard bra cup), while also having a smooth appearance.

These benefits are illustrated by the data in the below Examples.

Example 1

Bra cups were prepared according to the methods described above. Various combinations of spray and hot melt lamination were used in combination for the inner and outer laminates. The appearance and washability of the resulting articles was tested using the machine wash and dry cycle test described above to determine how the combination of lamination methods affects the product properties. Results are shown in Table A below.

TABLE A

| Option | Inner (first) laminate | Outer (second) Laminate | Result |
| --- | --- | --- | --- |
| 1 | Spray | Hot melt | Wash test pass. Inner laminated panel appearance good. Acceptable cost |
| 2 | Spray | Spray | Wash test pass. Inner laminated panel appearance good. More expensive than Option 1. |
| 3 | Hot melt | Hot melt | Wash test fail. Appearance bad. |
| 4 | Hot melt | Spray | Wash test fail. Appearance bad. |
| 5 | Hot melt* | Spray | Wash test pass. Inner laminated panel appearance good. Similar cost to Option 1. |
| 6 | Hot melt* | Hot melt | Wash test pass. Inner laminated panel appearance good. Cheaper than Option 1. |

Example 2

Exemplary (Table B), and minimum and maximum acceptable (Table C), compression amounts for inner and outer laminates having typical thicknesses for a bra cup are set out in Tables B and C below. As will be appreciated by a skilled person, the preferred level of compression will depend on various factors, such as the desired handfeel of the article, the nature of the article, and the starting thickness of the foam.

TABLE B

Exemplary compression amounts for typical inner and outer laminate thicknesses for a bra cup.

|  | initial foam thickness (mm) | after molding thickness (mm) | compression (mm) | % compression |
|---|---|---|---|---|
| Outer (second) foam | 3 | 1.5 | 1.5 | 50 |
| Inner (first) foam | 5 | 4.5 | 0.5 | 10 |

TABLE C

Maximum acceptable compression ranges for typical inner and outer foam thicknesses for a bra cup.

|  | initial foam thickness (mm) | after molding thickness (mm) | compression (mm) | % compression |
|---|---|---|---|---|
| Outer (second) foam | 3 | 2.5 to 0.5 | 0.5 to 2.5 | 17 to 83 |
| Inner (first) foam | 5 | 4.7 to 3 | 0.3 to 2 | 5 to 40 |

In Tables B and C above, the thickness refers only to the thickness of the foam and not to the fabric that is part of the laminate as well. This is because the fabric is so thin that it does not meaningfully contribute to the thickness of the laminate. It is noted that the outer foam's compression is obtained during the first molding step. As such, the second molding step does not meaningfully change the compression level of the outer foam's thickness, but it does affect the inner foam's thickness, as can be seen from the above-mentioned example.

The invention described herein may also be used to form impact protection wear and bra straps.

The invention claimed is:

1. A molded composite article, comprising:
a first foam laminate formed from a fabric and a polyurethane foam;
a second foam laminate formed from a fabric and a polyurethane foam; and
an adhesive bonding the first and second laminates together, wherein:
the molded composite article has been subjected to compression molding;
the polyurethane foam of the first foam laminate has a density of from 10 to 25 kg/m$^3$ before compression molding, and a hardness of from 2 to 20 before compression molding, as measured using an Asker type F Durometer;
the polyurethane foam of the second foam laminate has a hardness of from 45 to 90 before compression molding, as measured using an Asker type F Durometer;
the first foam laminate of the molded composite article is from 7 to 15% thinner relative to the same material before compression molding and the second foam laminate of the molded composite article is from 25 to 60% thinner relative to the same material before compression molding; and
wherein the composite article comprises one or both of the following:
(i) after ten machine wash and dry cycles, the composite article displays less than 3% shrinkage in a length and width directions, as compared to the original length and width dimensions of the composite article; and
(ii) after twenty-five machine wash and dry cycles, the composite article does not exhibit any delamination.

2. The article according to claim 1, wherein the first foam laminate has a density of from 18 to 22 kg/m$^3$ before compression molding.

3. The article according to claim 1, wherein the first foam laminate has a hardness of from 5 to 15 before compression molding, as measured using an Asker type F Durometer.

4. The article according to claim 1, wherein the second foam laminate has a density of from 10 to 80 kg/m$^3$ before compression molding.

5. The article according to claim 1, wherein the adhesive bonding the first and second laminates together is located in a peripheral region of the first and second laminates when said laminates are bonded together by said adhesive.

6. The article according to claim 1, wherein the first foam laminate was prepared by a low-tension lamination arrangement with use of a relaxed fabric, where said low-tension lamination arrangement comprises a winder roll tension of from 15 to 25N.

7. The article according to claim 1, wherein the first foam laminate was prepared by spray lamination, or wherein the first foam laminate was prepared by hot melt lamination using a low-tension lamination arrangement with use of a relaxed fabric, where said low-tension lamination arrangement comprises a winder roll tension of from 15 to 25N.

8. The article according to claim 1, wherein the second foam laminate was prepared by spray lamination or by hot melt lamination.

9. The article according to claim 1, wherein the article is a bra cup, a bra, a bra strap or the whole or part of an impact protection garment.

10. A method of forming a molded composite article comprising the steps of:
(a) providing a first foam laminate formed from a fabric and a polyurethane foam having a density of from 10 to 25 kg/m$^3$ and a hardness of from 2 to 20 and a second foam laminate formed from a fabric and a polyurethane foam having a hardness of from 45 to 90, wherein each laminate has a foam side and a fabric side, wherein the hardness is measured using an Asker type F durometer;
(b) subjecting the second foam laminate to thermoforming to provide a molded outer panel having a thickness that is from 25 to 60% thinner relative to the same material before thermoforming;
(c) applying an adhesive to the foam side of the first foam laminate and adhering the resulting adhesive-covered foam side of the first foam laminate to the foam side of the molded outer panel to form an intermediate product;
(d) subjecting the intermediate product to thermoforming to form the composite article, wherein the first foam laminate forms an inner panel of the composite article and has a thickness that is 7 to 15% thinner relative to the same material before thermoforming, wherein the composite article comprises one or both of the following:
(i) after ten machine wash and dry cycles, the composite article displays less than 3% shrinkage in a length and width directions, as compared to the original length and width dimensions of the composite article; and
(ii) after twenty-five machine wash and dry cycles, the composite article does not exhibit any delamination.

11. The method according to claim 10, wherein the first foam laminate has a density of from 18 to 22 $kg/m^3$ before thermoforming.

12. The method according to claim 10, wherein the first foam laminate has a hardness of from 5 to 15 before thermoforming, as measured using an Asker type F Durometer.

13. The method according to claim 10, wherein the second foam laminate has a density of from 10 to 80 $kg/m^3$ before thermoforming.

14. The method according to claim 10, wherein the first foam laminate was prepared by a low-tension lamination arrangement with use of a relaxed fabric, where said low-tension lamination arrangement comprises a winder roll tension of from 15 to 25N.

15. The method according to claim 10, wherein one or more of the following apply:
(a) the first foam laminate is prepared by spray lamination, or wherein the first foam laminate is prepared by hot melt lamination using a low-tension lamination arrangement with use of a relaxed fabric, where said low-tension lamination arrangement comprises a winder roll tension of from 15 to 25N;
(b) the second foam laminate is prepared by spray lamination or by hot melt lamination;
(c) the article is formed into a bra cup, a bra, a bra strap or the whole or part of an impact protection garment; and
(d) the adhesive bonding the first and second laminates together is located in a peripheral region of the first and second laminates when said laminates are bonded together by said adhesive.

* * * * *